US009418773B2

(12) United States Patent
Hermasch et al.

(10) Patent No.: US 9,418,773 B2
(45) Date of Patent: Aug. 16, 2016

(54) COMPOSITION OF POLYAMIDES WITH LOW CONCENTRATION OF CARBOXAMIDE GROUPS AND ELECTRICALLY CONDUCTIVE CARBON

(75) Inventors: Sylvia Anita Hermasch, Marl (DE); Roland Wursche, Dülmen (DE); Harald Häger, Lüdinghausen (DE); Kathrin Lehmann, Leverkusen (DE)

(73) Assignee: Evonik Degussa GmbH, Essen (DE)

( * ) Notice: Subject to any disclaimer, the term of this patent is extended or adjusted under 35 U.S.C. 154(b) by 532 days.

(21) Appl. No.: 13/882,689

(22) PCT Filed: Oct. 31, 2011

(86) PCT No.: PCT/EP2011/069125
§ 371 (c)(1),
(2), (4) Date: Jul. 15, 2013

(87) PCT Pub. No.: WO2012/059467
PCT Pub. Date: May 10, 2012

(65) Prior Publication Data
US 2013/0299750 A1 Nov. 14, 2013

(30) Foreign Application Priority Data
Nov. 5, 2010 (DE) .......................... 10 2010 043 470

(51) Int. Cl.
| | | |
|---|---|---|
| H01B 1/24 | (2006.01) |
| C09D 5/24 | (2006.01) |
| C08L 77/00 | (2006.01) |
| C09D 5/03 | (2006.01) |
| H01B 1/04 | (2006.01) |
| C08K 3/04 | (2006.01) |
| C08K 5/10 | (2006.01) |
| C08K 5/20 | (2006.01) |
| C08K 5/3445 | (2006.01) |

(52) U.S. Cl.
CPC . *H01B 1/24* (2013.01); *C08L 77/00* (2013.01); *C09D 5/032* (2013.01); *C09D 5/24* (2013.01); *H01B 1/04* (2013.01); *C08K 3/04* (2013.01); *C08K 5/10* (2013.01); *C08K 5/20* (2013.01); *C08K 5/3445* (2013.01)

(58) Field of Classification Search
CPC .............. H01B 1/00; H01B 1/04; H01B 1/24; C09D 5/24; C09D 11/324; C09D 11/52
See application file for complete search history.

(56) References Cited

U.S. PATENT DOCUMENTS

| | | | |
|---|---|---|---|
| 5,744,523 A * | 4/1998 | Barkowsky | B01F 17/0028 516/32 |
| 6,090,459 A | 7/2000 | Jadamus et al. | |
| 6,316,537 B1 | 11/2001 | Baumann et al. | |
| 6,656,997 B2 | 12/2003 | Baumann et al. | |
| 6,861,540 B2 | 3/2005 | Herwig et al. | |
| 7,393,396 B2 | 7/2008 | Lehmann et al. | |
| 7,601,771 B2 | 10/2009 | Schmidt et al. | |
| 7,608,738 B2 | 10/2009 | Herwig et al. | |
| 8,022,201 B2 | 9/2011 | Roos et al. | |
| 8,168,841 B2 | 5/2012 | Herwig et al. | |
| 8,232,333 B2 | 7/2012 | Haeger et al. | |
| 8,378,127 B2 | 2/2013 | Dingerdissen et al. | |
| 8,445,720 B2 | 5/2013 | Hannen et al. | |
| 8,703,451 B2 | 4/2014 | Haas et al. | |
| 8,703,993 B2 | 4/2014 | Hannen et al. | |
| 8,809,576 B2 | 8/2014 | Schraven et al. | |
| 8,871,862 B2 | 10/2014 | Pawlik et al. | |
| 9,000,223 B2 | 4/2015 | Micoine et al. | |
| 2004/0175573 A1* | 9/2004 | Fujihana | C08G 18/0819 428/423.1 |
| 2006/0100323 A1 | 5/2006 | Schmidt et al. | |
| 2006/0100326 A1* | 5/2006 | Kawakabe | B82Y 30/00 524/115 |
| 2007/0202287 A1 | 8/2007 | Katayama | |
| 2008/0114105 A1 | 5/2008 | Hell et al. | |
| 2008/0210907 A1 | 9/2008 | Yoshida et al. | |

(Continued)

FOREIGN PATENT DOCUMENTS

| | | |
|---|---|---|
| CN | 101307145 A | 11/2008 |
| EP | 1 519 988 | 4/2005 |
| EP | 2 038 337 | 3/2009 |
| WO | 2006 136715 | 12/2006 |
| WO | WO 2008/074564 A2 | 6/2008 |
| WO | 2010 046606 | 4/2010 |

OTHER PUBLICATIONS

International Search Report Issued Mar. 8, 2012 in PCT/EP11/069125 filed Oct. 31, 2011.
U.S. Appl. No. 14/435,339, filed Apr. 13, 2015, Engel, et al.
U.S. Appl. No. 14/363,178, filed Jun. 5, 2014, Haas, et al.

(Continued)

*Primary Examiner* — Mark Kopec
(74) *Attorney, Agent, or Firm* — Oblon, McClelland, Maier & Neustadt, L.L.P.

(57) ABSTRACT

A polyamide composition comprising the following components: a) at least 40 parts by weight of a polyamide whose monomer units contain an arithmetic average of at least 7.5 carbon atoms, b) 0.1 to 15 parts by weight of at least one salt with a non-metallic cation, c) 0.1 to 25 parts by weight of at least one dispersant based on esters or amides and d) an electrically conductive carbon selected from the group of carbon black, graphite powder, carbon fibers, carbon nanotubes and/or graphene, in an amount which results in a specific surface resistance of the polymer composition to IEC 60167 of $10^{-1}$ to $10^{10}\Omega$, e) 0 to 5 parts by weight of at least one metal salt, and optionally f) customary assistants and additives, where the polyamide of component a) is not a PA12 if carbon nanotubes are present as component d), and where the sum of the parts by weight of components a) to f) is 100, can be used for production of mouldings with improved electrical conductivity and improved surface quality.

19 Claims, No Drawings

(56) References Cited

U.S. PATENT DOCUMENTS

| | | | |
|---|---|---|---|
| 2010/0069557 A1* | 3/2010 | Moad | B29C 7/0004 524/451 |
| 2010/0230641 A1* | 9/2010 | Oki | H01M 4/131 252/502 |
| 2010/0261237 A1 | 10/2010 | Verseck et al. | |
| 2010/0324257 A1 | 12/2010 | Karau et al. | |
| 2011/0118433 A1 | 5/2011 | Pötter et al. | |
| 2011/0171702 A1 | 7/2011 | Reinecke et al. | |
| 2011/0201731 A1* | 8/2011 | Korzhenko | B82Y 30/00 524/127 |
| 2011/0251399 A1 | 10/2011 | Dingerdissen et al. | |
| 2012/0034665 A1 | 2/2012 | Haas et al. | |
| 2012/0071577 A1 | 3/2012 | Pfeffer et al. | |
| 2012/0077932 A1 | 3/2012 | Pfeffer et al. | |
| 2012/0153232 A1* | 6/2012 | Gibon | H01B 1/24 252/506 |
| 2012/0153233 A1* | 6/2012 | Gibon | H01B 1/24 252/506 |
| 2012/0264877 A1 | 10/2012 | Häger et al. | |
| 2012/0292578 A1* | 11/2012 | Bacher | B82Y 30/00 252/511 |
| 2013/0052700 A1 | 2/2013 | Poetter et al. | |
| 2013/0092232 A1 | 4/2013 | Pawlik et al. | |
| 2013/0092233 A1 | 4/2013 | Pawlik et al. | |
| 2013/0130319 A1 | 5/2013 | Schaffer et al. | |
| 2013/0165685 A1 | 6/2013 | Hannen et al. | |
| 2013/0171388 A1 | 7/2013 | Pawlik et al. | |
| 2013/0183725 A1 | 7/2013 | Poetter et al. | |
| 2013/0207050 A1 | 8/2013 | Hermasch et al. | |
| 2013/0240799 A1 | 9/2013 | Haeger et al. | |
| 2014/0141478 A1 | 5/2014 | Schaffer et al. | |
| 2014/0178948 A1 | 6/2014 | Schaffer et al. | |
| 2014/0186905 A1 | 7/2014 | Schaffer et al. | |
| 2014/0199736 A1 | 7/2014 | Kühler et al. | |
| 2014/0242646 A1 | 8/2014 | Pötter et al. | |
| 2014/0256904 A1 | 9/2014 | Schaffer et al. | |
| 2014/0308717 A1 | 10/2014 | Haas et al. | |
| 2015/0111254 A1 | 4/2015 | Hennemann et al. | |

OTHER PUBLICATIONS

U.S. Appl. No. 14/380,483, filed Aug. 22, 2014, Schiemann, et al.
U.S. Appl. No. 14/384,301, filed Sep. 10, 2014, Schaffer, et al.
U.S. Appl. No. 14/649,414, filed Jun. 3, 2015, Schaffer et al.

* cited by examiner

COMPOSITION OF POLYAMIDES WITH LOW CONCENTRATION OF CARBOXAMIDE GROUPS AND ELECTRICALLY CONDUCTIVE CARBON

CROSS REFERENCE TO RELATED APPLICATIONS

The present application is a 35 U.S.C. §371 national stage patent application of International patent application PCT/EP2011/069125, filed on Oct. 31, 2011, published as WO/2012/059467 on May 10, 2012, the text of which is incorporated by reference, and claims the benefit of the filing date of German application no. 102010043470.1, filed on Nov. 5, 2010, the text of which is also incorporated by reference.

The invention relates to plastics compositions based on polyamides, which contain electrically conductive carbon substrates such as carbon black, carbon fibres, graphite, graphene and/or CNTs (carbon nanotubes) and also salts having a nonmetallic cation or a synergistic mixture of these salts together with metal salts, where the combination with specific dispersants is essential.

Plastics are generally and except for a few very specific exceptions electrical insulators on which high surface charges can accumulate during production, processing and use of films or mouldings produced therefrom.

These static charges lead to undesirable effects and serious hazard situations which extend from attraction of dust, adhesion of hygienically problematical contaminants, destruction of electronic components through arcing, physiologically unpleasant electric shocks, ignition of combustible liquids in containers or tubes in which these liquids are stirred, poured or conveyed to dust explosions, for example when transferring the contents of large containers filled with dusts or finely ground material or in quarrying or coal mining.

Ever since the use of these plastics, there has therefore been the necessity of preventing static charges or else minimizing them to such an extent that they are no longer hazardous.

A generally employed method for making it possible for charges to be conducted away and the static charge to be minimized is the use of antistatics, i.e. nonionic or ionic interface-active compounds and in particular ammonium and alkali metal salts.

Essentially external and internal antistatics are used at the present day.

External antistatics are applied as aqueous or alcoholic solutions to the surface of the plastics by spraying, painting or dipping and subsequent drying in air. The antistatic film which remains is effective on virtually all plastics but has the disadvantage that it can be removed again very easily and unintentionally by means of friction or liquid. Owing to the lack of a depot effect of antistatic molecules migrating from the interior of the polymer composition (as is present in the case of internal antistatics), external antistatics do not have any long-term effect.

Preference is therefore given to using internal antistatics which are added as far as possible in pure form, otherwise in the form of "masterbatches", i.e. concentrated formulations, to the polymer composition before or during processing and are homogeneously distributed therein during the injection or extrusion process.

EP 2 038 337 refers to polymer compositions comprising polymers and ionic liquids and metal salts which together with glycols as solvents and solubilizers can impart antistatic properties to the polymer compositions. Carbon substrates are not used here.

EP 1 519 988 describes polymer compositions comprising polymers together with ionic liquids and the antistatic action thereof. Carbon substrates or metal salts are not used here.

A disadvantage of both publications is that only small proportions of antistatic can be introduced into the polymer if the mechanical properties of the polymers are not to be adversely affected.

Typical thermoplastics have specific surface resistances in the range from $10^{16}$ to $10^{14}$ ohm and can therefore build up voltages of up to 15 000 volt. Effective antistatics can reduce the specific surface resistances of the plastics to from $10^{10}$ to $10^9$ ohm. On the other hand, a significantly higher performance for conducting away electric charges has to be achieved if plastics are to be used in electronic components of large appliances, e.g. in the transformer or substation manufacturer sector, or in many applications in automobile and aircraft construction. Here, it is necessary to use electrically conductive moulding compositions which have to have a specific surface resistance of less than $10^9$ ohm. A critical factor here is that in such uses of plastics, not only the surface resistance but also the volume resistance through plastic parts having a thickness of up to a plurality of millimeters has to be in such a range, and in the case of parts produced by injection moulding, anisotropy effects frequently occur and are generally difficult to suppress.

For the manufacture of conductive plastic mouldings, there is therefore only the possibility of either using conductive plastics such as polyanilines and the like or making the above-mentioned plastics, which are electrical insulators, conductive by use of carbon blacks, in particular conductive carbon blacks, carbon fibres, graphite, graphene and/or CNTs.

Conductive carbon blacks are fractal structures which on mutual contact are able to conduct the electric charge further in the polymer and also guarantee a low volume resistance. This generally requires a high degree of fill in the range from 15 to 25% by weight, which not only has an adverse effect on the technical polymer properties, especially in respect of the mechanical parameters such as notched impact toughness or tensile strength, but also results in an unsatisfactory surface quality for components in visible positions, as is complained of by industry.

The term conductive carbon blacks refers to specific industrial carbon blacks which are produced, inter alia, by the furnace black process or by thermal dissociation by means of the acetylene black process. Their DBP (dibutyl phthalate) value is above 110 ml per 100 g of carbon black, indicating an extremely high specific surface area. Typical commercial products are, for example, Akzo Ketjenblack EC or Evonik Printex XE2 or Printex L6.

In comparison, carbon fibres or carbon nanotubes (CNTs) and especially graphene can be used in significantly lower concentrations, but dispersing them is extremely process-dependent. For example, how the CNTs are introduced in the region of the intake/feed opening into the extrusion screw and which screw configuration is selected in an extrusion process are critical to the later effectiveness. These are only a few relevant process parameters which stand in the way of any simple use. Furthermore, the costs of carbon fibres or CNTs are considerably above the price of conductive carbon blacks, and graphene is even more expensive, so that it is immediately clear that there is a further need for optimization in reducing the carbon fibre or CNT concentration. In addition, in the case of some plastics, dispersing these products is particularly difficult since the melt viscosity and the polarity of some thermoplastics oppose this.

Carbon nanotubes are a further modification of the element carbon in addition to graphite, diamond, amorphous carbon and fullerenes. The carbon atoms in carbon nanotubes are arranged in hexagons. The structure corresponds to a rolled-up monoatomic or multiatomic layer of graphite, so that a hollow cylinder having diameters of typically a few nanometers and a length up to a few millimeters is formed. A fundamental distinction is made between multiwalled and single-walled carbon nanotubes, in the literature usually abbreviated to MWNTs and SWNTs. Owing to the van der Waals forces, carbon nanotubes display a strong tendency to agglomerate into bundles, which is why disentangling/dispersing without severe shortening by high shear forces is essential in the extrusion process. Typical commercial products can be obtained from various manufacturers, and mention may be made by way of example of the companies Bayer, Nanocyl and Arkema which offer the grades Baytubes® C150P, Baytubes®C 150 HP, Baytubes® C 70P, Nanocyl™ NC 7000 and Graphistrength C100. Further manufacturers offer CNTs in the form of masterbatches, for example Hyperion and C-Polymers.

Metal salts are known and effective antistatics. However, they have the disadvantage that they have to be dissolved before use to achieve homogeneous distribution in plastics. Conventional solvents are alcohols, ethers, esters, polyethers, cyclic ethers, cyclic esters, amides, cyclic amides, aromatic compounds or organic solvents quite generally.

However, the solubility of the metal salts is sometimes very low, and large amounts of solvent therefore have to be used to achieve sufficient effective use concentrations.

Such amounts of solvent as additive in the polymer compositions cannot be processed in either large or small amounts in extrusion processes in the melting of the thermoplastics and incorporation of the conductive carbon-based products for safety reasons, and were also unacceptable in respect of the resulting plasticizing properties for the mechanical parameters of the plastics compositions since although a deviation from mechanical properties is tolerable, this must generally be no more than 10% below the initial value of the filled polymer without use of the additives, in the present case, for example, the metal salt together with the necessary solvent.

If such antistatic formulations are used in plastics, they have the disadvantage that they have an adverse effect on the optical and especially the physical properties of the end product.

Compared to moulding compositions based on polyamides such as PA6 or PA66, moulding compositions based on polyamides which have a relatively low concentration of carboxamide groups are the first choice for many applications because of the lower moisture absorption, the good resistance to polar and nonpolar media and the good mechanical properties.

Such moulding compositions frequently have to be made electrically dissipative or electrically conductive, with the following applications being particularly prominent at present:

prevention of static charging, e.g. in packaging, in metering systems for aerosols, powders or liquids, in fuel lines and, for example, in electronic components such as chip supports, where for safety reasons electrostatic charging has to be prevented, electromagnetic shielding of electric appliances and electronic assemblies, e.g. in motor vehicle, EDP, news and communications technology, and utilization of the electrical conductivity, e.g. potential control in cables, current-dependent switching elements, heating elements, or for electrostatic surface coating of parts made of plastic. Electrostatic surface coating has become established in recent years in a large number of sectors, in particular in the motor vehicle industry. A prerequisite for electrostatic surface coating is the ability to electrically charge the mouldings to be coated. This is easy in the case of metals, but is normally not possible to a sufficient extent in the case of conventional thermoplastics because of their low conductivity.

However, in the compounding of polymers with conductive fillers, agglomerates of incompletely dispersed fillers frequently occur and these limit the product quality of the composition. For example, such agglomerates can lead to surface defects which cannot be tolerated for the application. In addition, the conductivity achieved falls far short of the maximum possible conductivity at a given concentration of conductive filler.

The quality of dispersion can, for example, be assessed by optical microscopic examination of thin slices, with the proportion by area of agglomerates being measured.

In the light of the background, it was an object of the invention to improve the dispersing of electrically conductive fillers in the polyamides mentioned. In one aspect of the object, the surface quality of the moulding composition should be improved in this way. In a further aspect of the object, the electrical conductivity should be improved as a given content of electrically conductive filler or a lower filler content should be required for achieving a desired conductivity.

This object is achieved by the use of particular additives in order to achieve an improvement in dispersion.

The invention accordingly provides polyamide compositions comprising the following components:

a) at least 40 parts by weight, preferably at least 50 parts by weight and particularly preferably at least 60 parts by weight, of polyamide whose monomer units have an arithmetic mean of at least 7.5 carbon atoms, b) from 0.1 to 15 parts by weight, preferably from 1 to 12 parts by weight and particularly preferably from 2.5 to 10 parts by weight, of at least one salt having a nonmetallic cation, c) from 0.1 to 25 parts by weight, preferably from 1 to 20 parts by weight and particularly preferably from 2 to 15 parts by weight, of at least one dispersant based on esters or amides and d) an electrically conductive carbon selected from the group consisting of carbon black, graphite powders, carbon fibres, carbon nanotubes and graphene in an amount which in the polymer composition gives a specific surface resistance in accordance with IEC 60167 of from $10^{-1}$ to $10^{10} \Omega$, preferably from $10^0 \Omega$ to $10^8 \Omega$ and particularly preferably from $10^{-1} \Omega$ to $10^6 \Omega$, where the polyamide of component a) is not PA12 if carbon nanotubes are present as component d).

In addition, the polyamide composition can optionally contain e) from 0 to 5 parts by weight, preferably from 0.1 to 3 parts by weight and particularly preferably from 0.1 to 2 parts by weight, of at least one metal salt and f) customary auxiliaries and additives, where the sum of the parts by weight of the components a) to f) is 100.

In a possible embodiment, the polyamide composition contains from 0.1 to 10 parts by weight, preferably from 0.5 to 5 parts by weight and particularly preferably from 1 to 3.5 parts by weight, of component b), from 1 to 10 parts by weight, preferably from 1.5 to 8 parts by weight and particularly preferably from 2 to 5 parts by weight, of component c), from 1 to 10 parts by weight, preferably from 2 to 8 parts by weight and particularly preferably from 2.5 to 6 parts by weight, of carbon nanotubes as component d) and from 0 to 5 parts by weight, preferably from 0.1 to 4 parts by weight and particularly preferably from 0.5 to 3 parts by weight, of component e), where, here too, the sum of the parts by weight of components a) to f) is 100.

In a further possible embodiment, the polyamide composition also has a specific volume resistance in accordance with IEC 60093 of not more $10^9$ Ωm, preferably from $10^{-3}$ Ωm to $10^7$ Ωm and particularly preferably from $10^{-1}$ Ωm to $10^5$ Ωm.

The polyamides of the component a) can be prepared from a combination of diamine and dicarboxylic acid, from an ω-aminocarboxylic acid and/or the corresponding lactam. Here, the ω-aminocarboxylic acid or the lactam or a mixture of various monomers of this type contains an arithmetic mean of at least 7.5 carbon atoms. In the case of a combination of diamine and dicarboxylic acid, the arithmetic mean number of carbon atoms of diamine and dicarboxylic acid has to be at least 7.5. Suitable polymers are, for example, PA69 (which can be prepared from hexamethylenediamine [6 carbon atoms] and nonanedioic acid [9 carbon atoms]; the average number of carbon atoms in the monomer units is thus in this case 7.5), PA610, PA612, PA613, PA614, PA618, PA106, PA1010, PA1012, PA1212, PA1013, PA1014, PA11, PA9T, PA10T, PAPACM10, PAPACM12 and also polyamides in general which are derived from a diamine and nonadecanedioic acid. Copolyamides are also suitable; the above-mentioned building blocks diamine and dicarboxylic acid, ω-aminocarboxylic acid and lactam can be combined as desired. In addition, polyether amides and polyether ester amides based on these polyamides are also suitable for the purposes of the invention. Polyether amides are made up of dicarboxylic acid-regulated polyamide blocks and polyether diamine blocks, and polyether ester amides are correspondingly made up of dicarboxylic acid-regulated polyamide blocks and polyether diol blocks. The polyether units generally contain from 2 to 4 carbon atoms per ether oxygen. Polyether amides and polyether ester amides are known to those skilled in the art and commercially available in a large number of types.

Preference is given to an arithmetic mean of not more than 40 and particularly preferably not more than 26 carbon atoms being present in the monomer units in the polyamides of the component a).

The salts having a nonmetallic cation which are used according to the invention as component b) are preferably composed of at least one quaternary nitrogen and/or phosphorus compound and at least one anion, where the cation is particularly preferably selected from the group consisting of substituted ammonium, phosphonium, pyridinium, imidazolinium and imidazolium cations and especially preferably from the group consisting of acyclic quaternary ammonium, 1,3-dialkylimidazolium, 1,2,3-trialkylimidazolium, 1,3-dialkylimidazolinium and 1,2,3-trialkyl-imidazolinium cations, where the different charges of the cations and anions balance overall in each case.

Particularly preferably, the nonmetallic cation is selected from at least one cation of the general formulae:

(1)

(2)

(3)

(4)

where $R^1, R^2, R^3, R^4$ can be identical or different and can each be the following: hydrogen, a linear or branched or double bond-containing aliphatic hydrocarbon radical having from 1 to 30 carbon atoms or a saturated or unsaturated cycloaliphatic hydrocarbon radical having from 5 to 40 carbon atoms, an aromatic hydrocarbon radical having from 6 to 40 carbon atoms, an alkylaryl radical having from 7 to 40 carbon atoms, a linear or branched and optionally unsaturated aliphatic hydrocarbon radical which has from 2 to 30 carbon atoms and is interrupted by a radical containing one or more heteroatoms, e.g. oxygen, —NH—, —NR'—, a linear or branched or double bond-containing aliphatic hydrocarbon radical which has from 2 to 30 carbon atoms and is interrupted by one or more functions selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, a linear or branched or double bond-containing aliphatic or cycloaliphatic hydrocarbon radical which has from 1 to 30 carbon atoms and is terminally functionalized by —OH, —OR', —NH$_2$, —N(H)R', —N(R')$_2$ or a polyether —(R$^5$—O)$_n$—R$^6$ having a block or random structure, where R' is a saturated or unsaturated C$_1$-C$_{30}$-alkyl radical, in particular CH$_3$, R$^5$ is a linear or branched hydrocarbon radical containing from 2 to 4 carbon atoms, n is from 1 to 100, preferably from 2 to 60, and R$^6$ is hydrogen, a linear or branched or double bond-containing aliphatic hydrocarbon radical having from 1 to 30 carbon atoms, or a saturated or double bond-containing cycloaliphatic hydrocarbon radical having from 5 to 40 carbon atoms, an aromatic hydrocarbon radical having from 6 to 40 carbon atoms or an alkylaryl radical having from 7 to 40 carbon atoms or a radical —C(O)—R$^7$ where R$^7$ is a linear or branched or double bond-containing aliphatic hydrocarbon radical having from 1 to 30 carbon atoms or a double bond-containing cycloaliphatic hydrocarbon radical having from 5 to 40 carbon atoms or an aromatic hydrocarbon radical having from 6 to 40 carbon atoms or an alkylaryl radical having from 7 to 40 carbon atoms.

Further possible cations are ions which are derived from saturated or unsaturated cyclic compounds and from aromatic compounds having in each case at least one trivalent nitrogen atom in a 4- to 10-membered, preferably 5- or 6-membered, heterocyclic ring which may be further substituted. Such cations can be described in simplified form, (i.e. without indication of precise position and number of double bonds in the molecule) by the general formulae (5), (6) and (7) below, where the heterocyclic rings may optionally also contain a plurality of heteroatoms

(5)

-continued

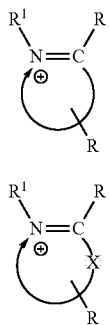

(6)

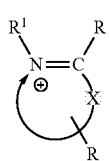

(7)

and the substituents have the following meanings

R is hydrogen, a linear or branched, optionally double bond-containing aliphatic hydrocarbon radical having from 1 to 30 carbon atoms, a cycloaliphatic, optionally double bond-containing hydrocarbon radical having from 5 to 40 carbon atoms, an aromatic hydrocarbon radical having from 6 to 40 carbon atoms or an alkylaryl radical having from 7 to 40 carbon atoms, $R^1$ and $R^2$ have the abovementioned meanings, X is an oxygen atom, a sulphur atom or a substituted nitrogen atom $NR^{1a}$, where $R^{1a}$ is hydrogen, a linear or branched, optionally double bond-containing aliphatic hydrocarbon radical having from 1 to 30 carbon atoms, an optionally double bond-containing cycloaliphatic hydrocarbon radical having from 5 to 40 carbon atoms, an aromatic hydrocarbon radical having from 6 to 40 carbon atoms, an alkylaryl radical having from 7 to 40 carbon atoms, a linear or branched, optionally double bond-containing aliphatic hydrocarbon radical which has from 2 to 30 carbon atoms and is interrupted by one or more heteroatoms (oxygen, NH, NR' where R' is an optionally double bond-containing $C_1$-$C_{30}$-alkyl radical, in particular $CH_3$), a linear or branched, optionally double bond-containing aliphatic hydrocarbon radical which has from 2 to 30 carbon atoms and is interrupted by one or more functions selected from the group consisting of —O—C(O)—, —(O)C—O—, —NH—C(O)—, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, a linear or branched, optionally double bond-containing aliphatic or cycloaliphatic hydrocarbon radical which has from 1 to 30 carbon atoms and is terminally functionalized by OH, OR', NH$_2$, N(H)R', N(R')$_2$ (where R' is an optionally double bond-containing $C_1$-$C_{30}$-alkyl radical) or a polyether —(R$^5$—O)$_n$—R$^6$ having a block or random structure.

Examples of cyclic cations based on the nitrogen compounds of the abovementioned type are those in which the nitrogen is part of a ring which is selected from among pyrrolidine, dihydropyrrole, pyrrole, imidazoline, oxazoline, oxazole, thiazoline, thiazole, isoxazole, isothiazole, indole, carbazole, piperidine, pyridine, the isomeric picolines and lutidines, quinoline and isoquinoline. The cyclic nitrogen compounds of the general formulae (5), (6) and (7) can be unsubstituted (R═H), monosubstituted or polysubstituted by the radical R, where in the case of polysubstitution by R the individual radicals R can be different.

Further possible cations are ions which are derived from saturated acyclic, saturated or unsaturated cyclic compounds and also from aromatic compounds having in each case more than one trivalent nitrogen atom in a 4- to 10-membered, preferably 5- or 6-membered, heterocyclic ring and contain more than one nitrogen atom in the ring. These compounds can be substituted both on the carbon atoms and on the nitrogen atoms. They can also be fused with optionally substituted benzene rings and/or cyclohexane rings to form polycyclic structures. Examples of such compounds are pyrazole, 3,5-dimethylpyrazole, imidazole, benzimidazole, N-methylimidazole, dihydropyrazole, pyrazolidine, pyridazine, pyrimidine, pyrazine, pyridazine, pyrimidine, 2,3-, 2,5- and 2,6-dimethylpyrazine, cinnoline, phthalazine, quinazoline, phenazine and piperazine. Cations of the general formula (8) derived from imidazole and its alkyl and phenyl derivatives have been found to be particularly useful as constituents of the salts having nonmetallic cations.

Further possible cations are ions which contain two nitrogen atoms and are represented by the general formula (8)

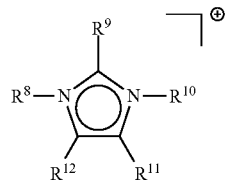

(8)

where $R^8$, $R^9$, $R^{10}$, $R^{11}$, $R^{12}$ are identical or different and are each hydrogen, a linear or branched, optionally double bond-containing aliphatic hydrocarbon radical having from 1 to 30, preferably from 1 to 8, in particular from 1 to 4, carbon atoms, a cycloaliphatic, optionally double bond-containing hydrocarbon radical having from 5 to 40 carbon atoms, an aromatic hydrocarbon radical having from 6 to 40 carbon atoms, an alkylaryl radical having from 7 to 40 carbon atoms, a linear or branched, optionally double bond-containing aliphatic hydrocarbon radical which has from 1 to 30 carbon atoms and is interrupted by one or more heteroatoms (oxygen, NH, NR' where R' is an optionally double bond-containing $C_1$-$C_{30}$-alkyl radical), a linear or branched, optionally double bond-containing aliphatic hydrocarbon radical which has from 1 to 30 carbon atoms and is interrupted by one or more functions selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, a linear or branched, optionally double bond-containing aliphatic or cycloaliphatic hydrocarbon radical which has from 1 to 30 carbon atoms and is terminally functionalized by OH, OR', NH$_2$, N(H)R', N(R')$_2$ where R' is an optionally double bond-containing $C_1$-$C_{30}$-alkyl radical, or a polyether —(R$^5$—O)$_n$—R$^6$ having a block or random structure, where $R^5$ is a hydrocarbon radical containing from 2 to 4 carbon atoms, n is from 1 to 100 and $R^6$ is hydrogen, a linear or branched, optionally double bond-containing aliphatic hydrocarbon radical having from 1 to 30 carbon atoms, a cycloaliphatic, optionally double bond-containing hydrocarbon radical having from 5 to 40 carbon atoms, an aromatic hydrocarbon radical having from 6 to 40 carbon atoms, an alkylaryl radical having from 7 to 40 carbon atoms or a radical —C(O)—R$^7$ where R$^7$ is a linear or branched, optionally double bond-containing aliphatic hydrocarbon radical having from 1 to 30 carbon atoms, an optionally double bond-containing cycloaliphatic hydrocarbon radical having from 5 to 40 carbon atoms, an aromatic hydrocarbon radical having from 6 to 40 carbon atoms or an alkylaryl radical having from 7 to 40 carbon atoms.

The type of anions in the salt of component b) is not critical. Suitable anions are selected by way of example from the group consisting of halides, carboxylates, phosphates, thiocyanate, isothiocyanate, dicyanamide, sulphate, hydrogensulphate, alkylsulphates and arylsulphates, polyether sulphates and polyether sulphonates, perfluoroalkylsulphates, alkylsulphonates and arylsulphonates, perfluorinated alkylsulphonates and arylsulphonates, tetrafluoroborate, hexafluorophosphate, bis(perfluoroalkylsulphonyl)amides or bis(perfluoroalkylsulphonyl)imides, bis(trifluoromethylsulphonyl)imide, alkyltosylates and aryltosylates, perfluoroalkyltosylates, nitrate, alkylcarboxylates and arylcarboxylates, perfluoroalkylcarboxylates, perchlorate, tetrachloroaluminate, saccharinate, tetraphenylborate, tetrakis(pentafluorophenyl)borate and polyether phosphates. Mixtures of different salts can also be used in this case.

Preference is given according to the invention to salts having a nonmetallic cation or mixtures thereof which are a combination of a 1,3-dialkylimidazolium, 1,2,3-trialkylimidazolium, 1,3-dialkyl-imidazolinium and/or 1,2,3-trialkylimidazolinium cation with an anion selected from the group consisting of halides, bis(trifluoromethylsulphonyl)imide, perfluoroalkyltosylates, alkylsulphates and alkylsulphonates, perfluorinated alkylsulphonates and alkylsulphates, perfluoroalkylcarboxylates, perchlorate, dicyanamide, thiocyanate, isothiocyanate, tetraphenylborate, tetrakis(pentafluorophenyl)borate, tetrafluoroborate and hexafluorophosphate. In addition, it is also possible to use simple, commercially available, acyclic quaternary ammonium salts such as ethylbis(polyethoxyethanol)(tallow alkyl)ammonium methylsulphate, methylbis(pentaethoxy-ethanol)coconutammonium methylsulphate, 1-butyl-3-methylimidazolium thiocyanate, 1-ethyl-3-methylimidazolium bromide, 1,3-dimethylimidazolium methylsulphate, 1-ethyl-3-methylimidazolium ethylsulphate, bis(2-hydroxyethyl)dimethylammonium methanesulphonate or Rezol Heqams (products of Evonik Goldschmidt GmbH).

The dispersant of the component c) can, for example, be selected from among the following classes:

c1) polyacrylic esters, which can be prepared by esterification of an alkyl polyacrylate which can be obtained by polymerization and whose alkyl radicals have from 1 to 3 carbon atoms and which preferably has a molar mass of 1000-10 000 g/mol and particularly preferably 2000-5000 g/mol, with
a) saturated aliphatic alcohols having from 4 to 50 and preferably from 8 to 30 carbon atoms, and/or
b) unsaturated aliphatic alcohols having from 4 to 50 and preferably from 8 to 30 carbon atoms,
where the molar ratio of the alcohol components a) and b) is from 1:0 to 0:1, preferably from 0.75:0.25 to 0.25:0.75 and particularly preferably from 0.6:0.4 to 0.4:0.6, and the components a) and b) are used in such amounts that from 30 to 100% and preferably from 70 to 100% of the ester groups are transesterified.

In a preferred embodiment, at least 25% of the ester groups are short-chain groups having from 1 to 4 carbon atoms in the alcohol part and at least 25%, particularly preferably at least 30% and in particular at least 40%, of the ester groups are long-chain groups having from 10 to 50 carbon atoms and preferably from 14 to 50 carbon atoms in the alcohol part. Preference is here given to oleyl radicals and stearyl radicals.

In addition to the alcohols mentioned, it is also possible, if desired, to make concomitant use of other alcohols in the transesterification, for instance polyoxyalkylene monools and/or dialkylaminoalkanols as are described in EP 0 751 171 A2.

Suitable products are, for example, commercially available under the names TEGOMER® DA 100N and TEGOMER® DA 102 (Evonik Goldschmidt GmbH).

c2) polyester-polyamine condensation products which can be obtained by partial or complete reaction of
A) one or more amino-functional polymers containing at least four amino groups with
B) one or more polyesters of the general formula (I)/(Ia)

and
C) one or more polyethers of the general formula (II)/(IIa)

where
T is a hydrogen radical and/or an optionally substituted, linear or branched aryl, arylalkyl, alkyl or alkenyl radical having from 1 to 24 carbon atoms,
A is at least one divalent radical selected from the group consisting of linear, branched, cyclic and aromatic hydrocarbons,
Z is at least one radical selected from the group consisting of sulphonic acids, sulphuric acids, phosphonic acids, phosphoric acids, carboxylic acids, isocyanates, epoxides, in particular phosphoric acid and (meth)acrylic acid,
B is a radical of the general formula (III)

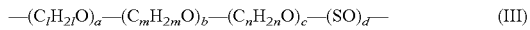

SO==—CH$_2$—CH(Ph)-O— where Ph=phenyl radical,
a, b, c are each, independently of one another, from 0 to 100,
with the proviso that the sum a+b+c is ≥0, preferably from 5 to 35, in particular from 10 to 20, with the proviso that the sum a+b+c+d is >0,
d is ≥0, preferably from 1 to 5,
l, m, n are each, independently of one another, ≥2, preferably from 2 to 4,
x, y are each, independently of one another, ≥2.

The reaction products can be present in the form of the amides and/or the corresponding salts. If the molecule part "Z" has a multiple bond, as can be the case, for example, in the polyethers and the alcohol-initiated polyesters in which the terminal OH group has been esterified with an unsaturated acid such as (meth)acrylic acid bonding is via a Michael addition of the NH function onto the double bond.

Examples of amino-functional polymers are amino-functional polyamino acids such as polylysine from Aldrich Chemical Co.; amino-functional silicones which can be obtained under the trade name Tegomer® ASi 2122 from Evonik Degussa GmbH; polyamidoamines which can be obtained under the trade names Polypox®, Aradur® or "Starburst®" dendrimers from Aldrich Chemical Co.; polyallylamines and poly(N-alkyl)allylamines which can be obtained under the trade name PAA from Nitto Boseki; polyvinylamines which can be obtained under the trade name Lupamin® from BASF AG; polyalkyleneimines, for example polyethyleneimines which can be obtained under the trade names Epomin® (Nippon Shokubai Co., Ltd.), Lupasol® (BASF AG); polypropyleneimines which can be obtained under the trade name Astramol® from DSM AG. Further examples of amino-functional polymers are the abovementioned systems crosslinked by means of amine-reactive groups. This linking reaction is, for example, carried out by means of polyfunctional isocyanates, carboxylic acids, (meth)acrylates and epoxides. Further examples are poly (meth)acrylate polymers comprising dimethylaminopropyl (meth)acrylamide (Evonik Degussa GmbH) or dimethylaminoethyl (meth)acrylate (Evonik Degussa GmbH) as monomers.

It will be known to a person skilled in the art that other amino-functional polymers are also possible; these can likewise be used.

Amino-functional polymers having a molecular weight of from 400 g/mol to 600 000 g/mol are typically employed.

Examples of the radical T are alkyl radicals having from 1 to 24 carbon atoms, e.g. the methyl, ethyl, propyl, isopropyl, butyl, isobutyl, tert-butyl, hexyl, isohexyl, octyl, nonyl, isononyl, decyl, dodecyl, hexadecyl and octadecyl radicals. Examples of optionally substituted aryl or arylalkyl radicals having up to 24 carbon atoms are the phenyl, benzyl, tolyl and phenethyl radicals.

The polyester groups —[O-A-C(O)]$_x$— and —[C(O)-A-O—]$_y$— contain an average of more than two ester groups and have an average molecular weight $M_n$ of from 100 to 5000 g/mol. Particular preference is given to $M_n$=200 to 2000 g/mol.

A particularly preferred embodiment of the present invention is characterized in that the polyester group is obtained by processes known per se by means of ring-opening polymerization using a starter molecule such as T-CH$_2$—OH or T-COOH and one or more lactones, for example β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methylcaprolactone, 5-hydroxydodecanoic lactone, 12-hydroxydodecanoic lactone, 12-hydroxy-9-octadecenoic acid, 12-hydroxyoctadecanoic acid.

Starter molecules such as T-COOH, and also the fatty alcohols T-CH$_2$—OH which can be prepared therefrom, are preferably the monobasic fatty acids based on natural vegetable or animal fats and oils having from 6 to 24 carbon atoms, in particular from 12 to 18 carbon atoms, which are known and customary in this field for example caproic acid, caprylic acid, capric acid, lauric acid, myristic acid, palmitic acid, palmitoleic acid, isostearic acid, stearic acid, oleic acid, linoleic acid, petroselic acid, elaidic acid, arachic acid, behenic acid, erucic acid, gadoleic acid, rapeseed oil fatty acid, soybean oil fatty acid, sunflower oil fatty acid, tall oil fatty acid which can be used either alone or in admixture in the form of their glycerides, methyl or ethyl esters or as free acids, and also the industrial mixtures obtained in pressure dissociation. All fatty acids having a similar chain distribution are suitable in principle.

The content of unsaturated material in these fatty acids or fatty acid esters is, insofar as necessary, set to the desired iodine number by means of known catalytic hydrogenation processes or achieved by blending of fully hydrogenated fat components with unhydrogenated fat components. The iodine number, as a measure of the average degree of saturation of fatty acid, is the amount of iodine taken up by 100 g of the compound to react with the double bonds.

Both the fatty acids and the resulting alcohols can be modified by molecular addition of alkylene oxides, in particular ethylene oxide and/or styrene oxide.

Examples of polyether building blocks of C are alkylene oxides such as: ethylene oxide, propylene oxide, butylene oxide, styrene oxide, dodecene oxide, tetradecene oxide, 2,3-dimethyloxirane, cyclopentene oxide, 1,2-epoxypentane, 2-isopropyloxirane, glycidyl methyl ester, glycidyl isopropyl ester, epichlorohydrin, 3-methoxy-2,2-dimethyloxirane, 8-oxabicyclo[5.1.0]octane, 2-pentyloxirane, 2-methyl-3-phenyloxirane, 2,3-epoxypropylbenzene, 2-(4-fluorophenyl) oxirane, tetrahydrofuran and their pure enantiomer pairs or enantiomer mixtures.

The group Z can be made up of addition products of carboxylic anhydrides such as succinic anhydride, maleic anhydride or phthalic anhydride.

The weight ratio of polyester to polyether in the dispersing resin according to the invention is in the range from 50:1 to 1:9, preferably from 40:1 to 1:5 and particularly preferably from 30:1 to 1:1.

A suitable polyester-polyamine condensation product is, for example, commercially available under the name TEGOMER® DA 626 (Evonik Goldschmidt GmbH).

For the purposes of the invention, any carbon black can in principle be used as component d); however, preference is given to using a conductive carbon black. In conductive carbon blacks used according to the invention, the primary particle size is in the range from 0.005 to 0.2 μm, preferably from 0.01 to 0.1 μm. The dibutyl phthalate adsorption of the conductive carbon blacks is in the range from 40 to 1000 ml per 100 g of carbon black, preferably from 90 to 600 ml per 100 g of carbon black. Many oxygen-containing groups, for example carboxyl, lactol, phenol groups, quinoide carbonyl groups and/or pyrone structures, can be present on the surface of the carbon black.

Conductive carbon blacks can be produced, for example, from acetylene, from synthesis gas or by the furnace process from oil, carrier gases and air. Production processes and properties are described, for example, in R. G. Gilg, "Ruß für leitfähige Kunststoffe" in: Elektrisch leitende Kunststoffe, editor: H. J. Mair, S. Roth, $2^{nd}$ edition, Carl Hanser Verlag, 1989, Munich, Vienna, pp. 21-36.

According to the invention, graphite powder is comminuted graphite. To a person skilled in the art, graphite is modification of carbon as described, for example, in A. F. Hollemann, E. Wieberg, N. Wieberg, "Lehrbuch der anorganischen Chemie", $91^{st}$-$100^{th}$ edition, pp. 701-702. Graphite consists of planar carbon layers which are arranged above one another.

Graphite can, according to the invention, be comminuted by, for example milling. The particle size is in the range from 0.01 μm to 1 mm, preferably in the range from 1 to 300 μm, most preferably in the range from 2 to 20 μm.

Many types of carbon fibres are commercially available. They are produced from organic starting materials. Possible compounds are first and foremost those which can firstly be converted into an infusible intermediate and can subsequently be carbonized to form carbon with retention of shape in a pyrrolysis process, for example cellulose, polyacrylonitrile or pitch. In the carbonization treatment, all elements except for the major part of the carbon are eliminated in gaseous form. The relative proportion of carbon increases with increasing temperature, which is usually in the range from 1300-1500° C. According to manufacturer's data, a carbon content of from 90 to 99 percent by weight is achieved in this way.

Above 1800° C., the process is known as graphitization. Here, in particular, the structure of the graphitic carbon layers is increasingly perfected. However, the distance between the planes of these carbon layers remains above the value known for actual graphite. Such "graphite fibres" are likewise suitable for the purposes of the invention.

Typical carbon fibres generally have a diameter in the order of from about 5 to 8 μm.

Preferred carbon nanotubes typically have the form of tubes formed by graphite layers. The graphite layers are arranged in a concentric fashion around the axis of the cylinder. Carbon nanotubes are also referred to as carbon nanofibrils. They have a length-to-diameter ratio of at least 5, preferably at least 100, particularly preferably at least 1000. The diameter of the nanofibrils is typically in the range from 0.003 to 0.5 μm, preferably in the range from 0.005 to 0.08 μm, particularly preferably in the range from 0.006 to 0.05 μm. The length of carbon nanofibrils is typically from 0.5 to 1000 μm, preferably 0.8 to 100 μm, particularly preferably from 1 to 10 μm. The carbon nanofibrils have a hollow, cylindrical core. This hollow space typically has a diameter of from 0.001 to 0.1 μm, preferably a diameter of from 0.008 to 0.015 μm. In a typical embodiment of the carbon nanotubes, the wall of the fibrils around the hollow space consists of, for example, 8 graphite layers. The carbon nanofibrils can be present as agglomerates which are made up of a plurality of nanofibrils and have a diameter of up to 1000 μm. The agglomerates can be in the form of birds' nests, combed yarn or open network structures. The synthesis of the carbon nanotubes is, for example, carried out in a reactor containing a carbon-containing gas and a metal catalyst, as described, for example in U.S. Pat. No. 5,643,502.

Apart from multiwalled carbon nanotubes (MWCNTs), single-walled carbon nanotubes (SWCNTs) can also be used according to the invention. SWCNTs typically have a diameter in the range of a few nanometers, but attain considerable lengths relative to their cross section, typically lengths in the region of a plurality of microns. The structure of SWCNTs is derived from monoatomic graphite layers (graphene) which can be thought of as rolled up to form a seamless cylinder. SWCNTs can be excellent electric conductors. The achievable current densities of $10^9$ A/cm$^2$ are about 1000 times that of metal wires composed of copper or silver. The production of SWCNTs is described, for example, in U.S. Pat. No. 5,424,054.

Graphene is the term for a modification of carbon having a two-dimensional structure in which each carbon atom is surrounded by three further carbon atoms so as to form a honeycomb-like pattern. Graphene is closely related structurally to graphite which can be thought of as a plurality of superposed graphenes. Graphene can be obtained in relatively large quantities by exfoliation of graphite (splitting into the basal planes). For this purpose, oxygen is intercalated into the graphite lattice, and this then reacts partially with the carbon and brings about intrinsic repulsion of the layers. After chemical reduction, the graphenes can, in further steps, be suspended in solutions and embedded in polymers.

The metal salts which are optionally used concomitantly as component e) are simple or complex compounds which have alkaline earth metal or alkali metal and/or zinc cations as cation and as anion contain, for example, anions selected from the group consisting of bis(perfluoroalkylsulphonyl) amide and bis(perfluoroalkylsulphonyl)imide, e.g. bis(trifluoromethylsulphonyl)imide, alkyltosylates and aryltosylates, perfluoroalkyltosylates, nitrate, sulphate, hydrogensulphate, alkylsulphates and arylsulphates, polyether sulphates and polyether sulphonates, perfluoroalkylsulphates, alkylsulphonates and arylsulphonates, perfluorinated alkylsulphonates and arylsulphonates, alkylcarboxylates and arylcarboxylates, perfluoroalkylcarboxylates, perchlorate, tetrachloroaluminate, saccharinate and preferably thiocyanate, isothiocyanate, dicyanamide, tetraphenylborate, tetrakis (pentafluorophenyl)borate, tetrafluoroborate, hexafluorophosphate, phosphate and polyether phosphates, where the charges balance within the anion-cation combinations and mixtures of different salts can also be used. As alkali metal cation of the metal salt, preference is given to the sodium, potassium, lithium or caesium cation.

Preferred mixtures are, in particular, those containing NaSCN or NaN(CN)$_2$ and/or KPF$_6$ as alkali metal salt and an imidazolinium or imidazolium salt, preferably 1-ethyl-3-methylimidazolium ethylsulphate (EMIM ES), as salt having a nonmetallic cation.

Apart from the constituents a) to e), the polyamide composition can additionally contain relatively small amounts of auxiliaries or additives which are required for setting particular properties. Examples are impact-modifying rubbers, further polymers such as polyphenylene ether, ABS or polyolefins, plasticizers, dyes, pigments and fillers such as titanium dioxide, zinc sulphide, silicates or carbonates, flame retardants, processing aids such as waxes, zinc stearate or calcium stearate, mould release agents, glass spheres, glass fibres, antioxidants, UV absorbers, HALSs or antidrip agents.

In a possible embodiment, the polyamide composition contains from 1 to 25% by weight of plasticizers, particularly preferably from 2 to 20% by weight and in particular from 3 to 15% by weight.

Plasticizers and their use in the field of polyamides are known. A general overview of plasticizers which are suitable for polyamides may be found in Gächter/Müller, Kunststoffadditive, C. Hanser Verlag, 2$^{nd}$ edition, p. 296.

Customary compounds suitable as plasticizers are, for example, esters of p-hydroxy-benzoic acid having from 2 to 20 carbon atoms in the alcohol component or amides of arylsulphonic acids having from 2 to 12 carbon atoms in the amine component, preferably amides of benzenesulphonic acid.

Possible plasticizers are, inter alia, ethyl p-hydroxybenzoate, octyl p-hydroxybenzoate, i-hexadecyl p-hydroxybenzoate, N-n-octyltoluenesulphonamide, N-n-butylbenzenesulphonamide or N-2-ethylhexylbenzenesulphonamide.

The polyamide composition of the invention is preferably produced from the individual constituents by melt-mixing in a kneading apparatus.

The components b) and c) can be added directly, either individually or together as a mixture, to the pelletized material, the polymer melt or the melt of all other components. For example, they can be metered as liquid by means of an optionally heated pump via optionally heated feed lines in the 1$^{st}$ third of the extrusion section. However, they can also be added, either individually or together as a mixture, in the form of a masterbatch. Such a masterbatch can contain from about 20 to about 70% by weight of these components. The remainder of the masterbatch usually consists of polyamide, as is also used as component a), or of a polyamide which is compatible with the polyamide of component a).

The polyamide composition of the invention is preferably a polyamide moulding composition. However, it can also be a powder which is employed, for example, for surface coatings or for layer-by-layer buildup processes, for instance in rapid prototyping, for example using laser sintering, mask sintering or selective absorbing sintering (SAS).

Mouldings can be produced from the polyamide moulding composition of the invention and processed further by all conventional methods of the prior art, for example by extrusion, coextrusion, blow moulding or injection moulding. Here, the term "moulding" also encompasses sheet-like bodies such as films or plates. The mouldings obtained are likewise provided by the invention.

It has surprisingly been found that the electrical dissipative effect or the electrical conductivity brought about by the component d) is improved further by addition of components b) and c). Here, a synergistic effect is found when b) and c) are simultaneously present. If b) is also present, the amount of c) required to achieve a particular conductivity level is only half as much as when c) alone is present. As a result of the improvement in the percolation behaviour, only a smaller total amount of the component d) is required; this is particularly advantageous when using CNTs or graphene, which are very expensive.

As a result of better dispersing and the possible reduction in the concentration of the component d), the polymer composition has an improved surface quality, which can be determined by means of a microscope or better by measurement of the coefficient of friction or the gloss.

In addition, in many cases the impact toughness and notched impact toughness of the polymer composition of the invention are improved compared to a composition not containing the components b) and c). The same applies to the tensile strength.

The mouldings made of the polyamide moulding composition of the invention are widely used where good conductivity properties combined with good mechanical properties are demanded, for example in the industrial sectors of automobiles, aircraft and electronics and also in communications technology, safety technology and lightweight construction technology. Examples of applications are instrument switches for explosion-protected rooms, antistatic housings, fuel filters and plug connectors.

The invention claimed is:

1. A polyamide composition, comprising:
   a) at least 40 parts by weight of a polyamide whose monomer units have an arithmetic average of 7.5 carbon atoms or more;
   b) from 0.1 to 15 parts by weight of at least one salt having a nonmetallic cation;
   c) from 0.1 to 25 parts by weight of at least one dispersant based on an ester or an amide;
   d) an electrically conductive carbon selected from the group consisting of carbon black, a graphite powder, a carbon fiber, a carbon nanotube and graphene, in an amount such that the polyamide composition has a specific surface resistance in accordance with IEC 60167 of from $10^{-1}$ to $10^{10}\Omega$;
   e) from 0 to 5 parts by weight of at least one metal salt; and
   f) optionally one or more auxiliaries or additives, based on a total of 100 parts by weight of a) to f),
   wherein the polyamide of a) is not PA12 when the electrically conductive carbon of d) comprises a carbon nanotube, and
   the nonmetallic cation of b) consists of a quaternary nitrogen compound.

2. The polyamide composition of claim 1, comprising from 0.1 to 10 parts by weight of b),
from 1 to 10 parts by weight of c),
from 1 to 10 parts by weight of a carbon nanotube as d), and
from 0 to 5 parts by weight of e).

3. The polyamide composition of claim 2, having a specific volume resistance in accordance with ICE 60093 of not more than $10^9$ Ωm.

4. The polyamide composition of claim 2, wherein the nonmetallic cation of b) is acyclic quaternary ammonium.

5. The polyamide composition of claim 1, having a specific volume resistance in accordance with ICE 60093 of not more than $10^9$ Ωm.

6. The polyamide composition of claim 1, wherein the dispersant of c) is c1) or c2):
   c1) a polyacrylic ester, obtained by esterification of an alkyl polyacrylate which is optionally obtained by polymerization and whose alkyl radicals have from 1 to 3 carbon atoms, with at least one alcohol selected from the group consisting of a) and b):
   a) a saturated aliphatic alcohol having from 4 to 50 carbon atoms, and
   b) an unsaturated aliphatic alcohol having from 4 to 50 carbon atoms,
   where a) and b) are included in an amount such that from 30 to 100% of ester groups are transesterified,
   and
   c2) a polyester-polyamine condensation product obtained by partial or complete reaction of
   A) one or more amino-functional polymers comprising at least four amino groups, with
   B) one or more polyesters of formula (I) or (Ia)

   T-C(O)—[O-A-C(O)]$_x$—OH    (I)

   T-O—[C(O)-A-O-]$_y$Z    (Ia)

and
   C) one or more polyethers of formula (II) or (IIa)

   T-C(O)—B—Z    (II)

   T-O—B—Z    (IIa)

where
   T is independently at each occurrence a hydrogen radical or an optionally substituted, linear or branched aryl, arylalkyl, alkyl or alkenyl radical having from 1 to 24 carbon atoms,
   A is independently at each occurrence at least one divalent radical selected from the group consisting of a linear, branched, cyclic and aromatic hydrocarbon,
   Z is independently at each occurrence at least one radical selected from the group consisting of a sulphonic acid, a sulphuric acid, a phosphonic acid, a phosphoric acid, a carboxylic acid, an isocyanate, and an epoxide,
   B is independently at each occurrence a radical of formula (III)

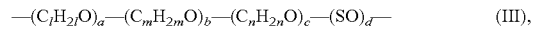   —(C$_l$H$_{2l}$O)$_a$—(C$_m$H$_{2m}$O)$_b$—(C$_n$H$_{2n}$O)$_c$—(SO)$_d$—    (III), where
   SO is —CH$_2$—CH(Ph)-O— where Ph is a phenyl radical,
   a, b, and c are each, independently of one another, from 0 to 100, with the proviso that a+b+c≥0, and a+b+c+d>0,
   d≥0,
   l, m, and n are each, independently of one another, 2 or greater, and
   x and y are each, independently of one another, 2 or greater.

7. The polyamide composition of claim 6, wherein the dispersant of c) is c1).

8. The polyamide composition of claim 6, wherein the dispersant of c) is c2).

9. The polyamide composition of claim 6, wherein a, b and c are each independently from 5 to 35.

10. The polyamide composition of claim 6, wherein a, b and c are each independently from 10 to 20.

11. The polyamide composition of claim 6, wherein d is from 1 to 5.

12. The polyamide composition of claim 6, wherein l, m and n are each independently from 2 to 4.

13. The polyamide composition of claim 6, having a specific volume resistance in accordance with ICE 60093 of not more than $10^9$ Ωm.

14. The polyamide composition of claim 1, wherein the metal salt of e) is an alkali metal salt, an alkaline earth metal salt or a zinc salt.

15. The polyamide composition of claim 14, having a specific volume resistance in accordance with ICE 60093 of not more than $10^9$ Ωm.

16. A moulding, comprising:
the polyamide composition of claim 1.

17. The polyamide composition of claim 1, wherein the nonmetallic cation of b) is acyclic quaternary ammonium.

18. The polyamide composition of claim 1, wherein the nonmetallic cation of b) has formula (1) or (2):

   (1)

   (2)

where
$R^1$, $R^2$, $R^3$, and $R^4$ are independently selected from the group consisting of hydrogen, a linear or branched or double bond-containing aliphatic hydrocarbon radical having from 1 to 30 carbon atoms or a saturated or unsaturated cycloaliphatic hydrocarbon radical having from 5 to 40 carbon atoms, an aromatic hydrocarbon radical having from 6 to 40 carbon atoms, an alkylaryl radical having from 7 to 40 carbon atoms, a linear or branched and optionally unsaturated aliphatic hydrocarbon radical which has from 2 to 30 carbon atoms and is interrupted by a radical containing one or more heteroatoms, a linear or branched or double bond-containing aliphatic hydrocarbon radical which has from 2 to 30 carbon atoms and is interrupted by one or more functions selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, —N(CH$_3$)—S(O$_2$)—, and a linear or branched or double bond-containing aliphatic or cycloaliphatic hydrocarbon radical which has from 1 to 30 carbon atoms and is terminally functionalized by —OH, —OR', —NH$_2$, —N(H)R', —N(R')$_2$ or a polyether —(R$^5$—O)$_n$—R$^6$ having or random structure,
where
R' is a saturated or unsaturated $C_1$-$C_{30}$-alkyl radical,
$R^5$ is a linear or branched hydrocarbon radical comprising from 2 to 4 carbon atoms,
n is from 1 to 100, and
$R^6$ is hydrogen, a linear or branched or double bond-containing aliphatic hydrocarbon radical having from 1 to 30 carbon atoms, or a saturated or double bond-containing cycloaliphatic hydrocarbon radical having from 5 to 40 carbon atoms, an aromatic hydrocarbon radical having from 6 to 40 carbon atoms or an alkylaryl radical having from 7 to 40 carbon atoms or a radical —C(O)—$R^7$,
where
$R^7$ is a linear or branched or double bond-containing aliphatic hydrocarbon radical having from 1 to 30 carbon atoms, a double bond-containing cycloaliphatic hydrocarbon radical having from 5 to 40 carbon atoms, an aromatic hydrocarbon radical having from 6 to 40 carbon atoms, or an alkylaryl radical having from 7 to 40 carbon atoms.

19. The polyamide composition of claim 8, having a specific volume resistance in accordance with ICE 60093 of not more than $10^9$ Ωm.

\* \* \* \* \*